(12) United States Patent
Mons

(10) Patent No.: US 7,261,784 B2
(45) Date of Patent: Aug. 28, 2007

(54) METHOD OF MAKING A COATING ON A METAL SUBSTRATE AND/OR AN ARTICLE, SUCH A COATING, SUCH A METAL SUBSTRATE AND/OR AN ARTICLE, AND A CAM FORMING SUCH AN ARTICLE

(75) Inventor: Claude Mons, Savigny le Temple (FR)

(73) Assignee: Snecma Moteurs, Paris (FR)

( * ) Notice: Subject to any disclaimer, the term of this patent is extended or adjusted under 35 U.S.C. 154(b) by 442 days.

(21) Appl. No.: 10/733,351

(22) Filed: Dec. 12, 2003

(65) Prior Publication Data

US 2004/0121177 A1 Jun. 24, 2004

(30) Foreign Application Priority Data

Dec. 13, 2002 (FR) .................................. 02 15800

(51) Int. Cl.
*B32B 37/16* (2006.01)
(52) U.S. Cl. .................. 156/94; 29/402.09; 29/402.13; 29/402.16; 228/119; 228/262.31; 228/262.42; 228/262.45; 228/262.61; 228/262.9; 427/142; 427/282
(58) Field of Classification Search ...................... None
See application file for complete search history.

(56) References Cited

U.S. PATENT DOCUMENTS

| | | | |
|---|---|---|---|
| 3,778,586 A | | 12/1973 | Breton et al. |
| 4,726,101 A | * | 2/1988 | Draghi et al. ............... 29/889.1 |
| 5,523,169 A | * | 6/1996 | Rafferty et al. ............. 428/551 |
| 5,577,655 A | * | 11/1996 | Mizuhara .................... 228/56.3 |
| 6,207,300 B1 | * | 3/2001 | Koch et al. .................. 428/680 |
| 6,302,318 B1 | * | 10/2001 | Hasz et al. .................. 228/254 |
| 6,402,464 B1 | * | 6/2002 | Chiu et al. ................... 415/116 |
| 6,541,075 B2 | * | 4/2003 | Hasz et al. .................. 427/454 |
| 6,637,643 B2 | * | 10/2003 | Hasz et al. .................. 228/119 |
| 6,679,680 B2 | * | 1/2004 | Um et al. .................. 415/173.1 |
| 6,827,254 B2 | * | 12/2004 | Hasz et al. .................. 228/246 |
| 6,846,575 B2 | * | 1/2005 | Hasz et al. .................. 428/606 |
| 2002/0108375 A1 | * | 8/2002 | Johnson et al. ............... 60/772 |

FOREIGN PATENT DOCUMENTS

| | | |
|---|---|---|
| EP | 0 686 457 A1 | 6/1995 |
| EP | 1 029 629 A2 | 2/2000 |
| FR | 2 604-448 A1 | 9/1987 |
| FR | 2 657 801 A1 | 1/1991 |

* cited by examiner

*Primary Examiner*—Jessica Ward
(74) *Attorney, Agent, or Firm*—Oblon, Spivak, McClelland, Maier & Neustadt, P.C.

(57) ABSTRACT

The method of the invention enables a coating to be made on at least one face to be protected of a metal substrate and/or article in order to improve its performance in terms of resistance to wear by friction, in particular at high temperature. The method comprises the following steps:
  providing a flexible sheet derived from at least one plate obtained by the technique of casting a strip by silk-screen printing from a viscous material made of a binder and a metal powder of a superalloy;
  cutting said flexible sheet to the dimensions of said face to be protected of a metal substrate and/or article in order to constitute a preform;
  placing said preform on said face to be protected of a metal substrate and/or article; and
  raising the assembly to a temperature enabling a coating to be formed by establishing a bond between said preform and said face to be protected.

20 Claims, 1 Drawing Sheet

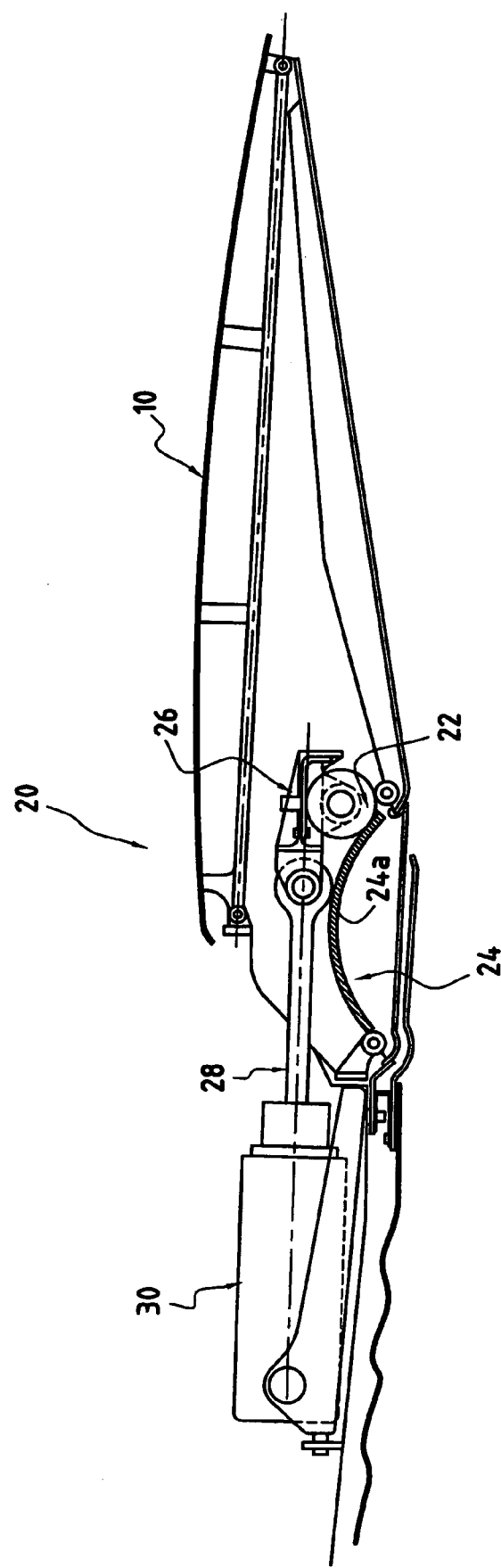

METHOD OF MAKING A COATING ON A METAL SUBSTRATE AND/OR AN ARTICLE, SUCH A COATING, SUCH A METAL SUBSTRATE AND/OR AN ARTICLE, AND A CAM FORMING SUCH AN ARTICLE

The invention relates to metal articles subjected to high temperatures while they are in use.

In particular, the invention relates to a method of manufacturing such articles easily, which articles need to withstand corrosion and above all friction wear coming from repeated contact with one or more other parts, in order to obtain such articles that present performance that is more satisfactory and lifetime that is longer.

BACKGROUND OF THE INVENTION

There exist numerous applications in which metal articles are exposed to high temperatures. Such applications relate, for example, to a variety of aerospace applications and also to terrestrial operations where parts are used in gas turbine engines.

In all these applications, it is important to provide means for avoiding excessively fast wear of articles subjected to friction or contact in normal use, given that such wear considerably shortens their lifetime and can lead to real problems concerning performance and safety.

Articles of this type, such as rolling parts or cams, usually present a contact surface that is not plane and that may be more or less irregular in shape.

Conventionally, such articles are coated, in particular on their contact surfaces, with a coating that improves their ability to withstand wear at high temperatures.

Usually, the coatings are deposited by various techniques such as vapor deposition, plasma sputtering, electrolysis, chemical means, etc.

Given that the contact surface for coating may present a shape that is very complex, it is difficult to obtain uniform thicknesses by using those direct deposition techniques. In addition, the cost and the limitations of those deposition techniques do not enable large thickness to be obtained for such protective coatings.

OBJECTS AND SUMMARY OF THE INVENTION

The present invention seeks in particular to mitigate those drawbacks inherent to the limitations concerning coating application of the above-specified direct deposition techniques.

To this end, an object of the present invention is to provide a method of treating metal articles, specifically to ensure they are capable of withstanding friction under high-temperature operating conditions.

Another object of the present invention is to provide metal articles provided with a coating enabling them to withstand most particularly friction under high-temperature operating conditions.

The present invention also relates to a coating for a metal article, the coating serving to improve the article's ability to withstand friction at high temperature.

It is known that various alloys, including most superalloys, are characterized by some degree of resistance to oxidation and to corrosion in an aggressive medium, and also by good mechanical strength at high temperatures.

The present invention takes advantage of those characteristics by proposing a method of making a coating on at least one face to be protected of a metal substrate and/or article in order to improve its performance in terms of resistance to friction wear, in particular at high temperature, the method comprising the following steps:

providing a flexible sheet derived from at least one plate obtained by the technique of casting a strip by silkscreen printing from a viscous material comprising a metallic brazing binder and a metal powder including a superalloy;

cutting said flexible sheet to the dimensions of said face to be protected of a metal substrate and/or article in order to constitute a preform;

placing said preform on said face to be protected of a metal substrate and/or article; and raising the assembly to a temperature higher than the melting temperature of the brazing binder but lower than the melting temperature of said metal powder so as to form a coating by establishing a bond between said preform and said face to be protected of a metal substrate and/or article.

In order to reach the above-specified objects, the present invention thus proposes implementing a coating which enables the brazing diffusion building-up ("BDB") technique to be applied. To this end, the coating used comprises a metal powder of a superalloy in a brazing binder such as a metallic or an organic binder.

The metal powder may be associated with ceramic powder such as powdered nitrides, carbides, borides, etc. . . . in order to increase the hardness of the coating.

In this way, it will be understood that because of the presence of the superalloy powder, the coating offers the same characteristics of resistance to wear by friction as are provided by the superalloy in bulk.

Such an arrangement is also easy to implement by using the technique of casting a strip by silkscreen printing.

Preferably, said metal powder presents grains of a size that is preferably less than or equal to 90 micrometers ($\mu$m), and more preferably lies in the range 40 $\mu$m to 65 $\mu$m.

In a preferred disposition, said flexible sheet comes from at least two plates obtained by the strip casting technique by silkscreen printing a viscous material, said plates being superposed and then dried out at least in part in order to form said flexible sheet.

Naturally, when the shape of the surface to be protected on the metal substrate and/or the article is simple, the strip can be cast directly on said surface plate after plate so as to form the flexible sheet.

Such an implementation makes it possible to obtain thick flexible sheets more easily than is possible with conventional direct deposition techniques.

The base metal of the substrate alloy is preferably selected from the group comprising Fe, Ni, and Co, and the substrate alloy is preferably a superalloy.

The present invention also provides a coating for a metal substrate and/or article for improving its performance in terms of resistance to wear by friction, in particular at high temperature, the coating being formed by a flexible sheet derived from at least one plate obtained by the technique of casting a strip by silkscreen printing from a viscous material formed by a binder and a metal powder of a superalloy.

Said binder is preferably organic, in particular containing polytetrafluoroethylene (PTFE), and said superalloy is based on Ni or on Co.

It should be observed that said flexible sheet presents at thickness that may lie in the range 0.3 millimeters (mm) to 5 mm, and preferably lies in the range 0.5 mm to 2 mm.

The present invention also provides a metal substrate and/or article including a coating of the above-specified type.

Finally, the present invention also provides a cam for guiding at least one wheel in a system for deploying a flap of a nozzle of the converging/diverging type of a turbojet engine, the cam being constituted by an article of the type defined in the preceding paragraph.

BRIEF DESCRIPTION OF THE DRAWING

Other advantages and characteristics of the invention appear on reading the following description made by way of example and with reference to the accompanying drawing, in which:

the sole FIGURE is a diagrammatic longitudinal section view of a system for controlling the flaps of a converging/diverging type nozzle of a turbojet engine.

MORE DETAILED DESCRIPTION

As can be seen in the sole FIGURE, in order to control the position of each flap 10 of a converging/diverging type nozzle of a turbojet engine, use is made of a deployment system 20.

The deployment system 20 includes wheels 22 which run along a cam 24.

The wheels 22 are preferably of the ball bearing type, and they are made in particular out of steel. The wheels 22 are mounted to rotate on a support 26 pivotally articulated to the free end of a rod 28 of a control piston 30.

The cam 24 presents a top face forming a guide face 24a for the wheels 22 and presenting an outline of shape that is substantially a portion of a cylinder of circular section.

It will thus be understood that this guide face 24a of the cam 24 is not only subjected to the high operating temperatures of the nozzle of the turbojet engine, but also to friction forces generated by rolling and friction from the running surfaces of the wheels 22.

In which case, the temperature reached by the deployment system 20 lies in the range 20° C. to 900° C., and this temperature is generally about 450° C.

The cam 24 is made of steel or of superalloy, preferably of a nickel or cobalt based superalloy, e.g. NK15CADT or KC25NW.

In accordance with the invention, a coating is made on the guide face 24a of the cam 24 by means of a flexible sheet.

To make the flexible sheet, use is made of the technique of casting a strip by silkscreen printing. To do this, a superalloy powder is initially mixed with a binder, preferably an organic binder, so as to form a material that is viscous at the temperature of use, which temperature is preferably ambient temperature, but could also be a temperature higher than ambient temperature.

Thereafter, thin plates are made by coating the material on a fine metal grid: by spreading the material, its passage through the fine mesh of the grid serves to obtain a plate presenting a thickness lying in the range 0.3 mm to 2 mm.

The mesh of the grid preferably presents a dimension lying in the range 0.1 mm to 0.5 mm, and preferably lying in the range 0.1 mm to 0.2 mm.

The grain size of the powder is selected to provide grains that are relatively fine, preferably less than or equal to 90 µm in size, and more preferably lying in the range 40 µm to 65 µm.

The plates are superposed to build up the above-mentioned flexible sheet which is then allowed to dry, at least in part, so as to allow binding to take place between the binders of the various plates.

After at least partial drying, a flexible sheet is obtained which is easily handled without any risk of tearing.

At this stage, a flexible sheet is available of thickness that may lie in the range 0.3 mm to 2 mm, and preferably in the range 0.5 mm to 1 mm.

Thereafter, the flexible sheet is cut out to the shape of the developed outline of the guide face 24a, thereby forming a preform which is placed so as to cover the guide face 24a.

The preform is bonded with the material constituting the cam 24 by a brazing diffusion technique by raising the cam covered in the preform to a temperature higher than the melting temperature of the binder but lower than the melting temperature of the material constituting the cam 24 or the superalloy.

By way of example, the assembly is raised to 1050° C.

At the end of this brazing operation, a superalloy layer is obtained that is connected to the cam 24 by metallurgical bonds.

It is then possible to rework the surface by machining, such as milling or polishing.

It will thus be understood that using this technique of fabricating a preform by silkscreen printing makes it possible to obtain a coating layer for large areas (easily up to 400 square centimeters ($cm^2$) or more), that completely takes up the shape of the relief on the face to be protected of the metal article, regardless of the complexity of the relief in question.

This technique, which is very flexible to implement, also makes it possible to obtain preforms that are strictly of a predetermined thickness over its entire area. It can be desirable for thickness to be constant over the entire area of the preform, or else for preforms to be obtained that have certain zones of greater or of lesser thickness.

The technique also enables the resulting preforms to be obtained repetitively by performing the same sequence of operations under identical operating conditions, as is necessary in the context of industrial use.

It is preferable to use a powder of a superalloy based on nickel or cobalt such as one of the following, where percentages are percentages by weight:

superalloy 1: based on Ni, Co (18%), Cr (11%), Mo (4%), Al (3%), Ti (2.5%), Si (1%), B (0.7%) and traces of other elements;

superalloy 2: based on Co, Ni (25%), Cr (23%), W (6%), B (0.7%), C (0.4%) and traces of other elements;

superalloy 3: based on Co, Ni (29%), Cr (18%), W (5%), Si (1.4%), B (0.9%), C (0.35%) and traces of other elements.

Binders that are suitable for use are preferably organic binders such as those having an aqueous base such as an aqueous dispersion of PTFE powder.

More generally, other applications of the present invention include obtaining coatings for abradable surfaces and/or sectors, and also building-up wear surfaces on the bearing surfaces of superalloy parts.

What is claimed is:

1. A method of making a coating on at least one face to be protected of a metal substrate and/or metal article in order to improve its performance in terms of resistance to friction wear, in particular at high temperature, the method comprising the following steps:

providing a flexible sheet derived from at least one plate obtained by the technique of casting a strip by silkscreen printing from a viscous material comprising a metallic brazing binder and a metal powder including a superalloy;

cutting said flexible sheet to the dimensions of said face to be protected of said metal substrate and/or metal article in order to constitute a preform;

placing said preform on said face to be protected of said metal substrate and/or metal article; and raising the assembly to a temperature higher than the melting temperature of the metallic brazing binder but lower than the melting temperature of said metal powder so as to form a coating by establishing a bond between said preform and said face to be protected of said metal substrate and/or metal article.

2. A method according to claim 1, wherein said metal powder presents grain size that is preferably less than or equal to 90 μm, and preferably lies in the range 40 μm to 65 μm.

3. A method according to claim 1, wherein said flexible sheet is derived from at least two plates obtained by the technique of casting strips by silkscreen printing from a viscous material, said strips being superposed and then dried, at least in part, in order to form said flexible sheet.

4. A method according to claim 1, wherein the substrate is an alloy whose base metal is selected from the group comprising Fe, Ni, and Co.

5. The method of claim 1, further comprising a step of at least partially drying said plates before cutting said flexible sheet.

6. The method of claim 1, wherein the superalloy comprises, by weight, Ni, Co (18%), Cr (11%), Mo (4%), Al (3%), Ti (2.5%), Si (1%), and B (0.7%).

7. The method of claim 1, wherein the superalloy comprises, by weight, Co, Ni (25%), Cr (23%), W (6%), B (0.7%), and C (0.4%).

8. The method of claim 1, wherein the superalloy comprises, by weight, Co, Ni (29%), Cr (18)%, W (5%), Si (1.4%), B (0.9%), and C (0.35%).

9. The method of claim 1, wherein raising the temperature of the assembly includes raising the temperature to 1050° C.

10. The method of claim 1, wherein providing a flexible sheet and cutting said flexible sheet provides a preform with zones of different thickness.

11. A method of making a coating on at least one face to be protected of a metal substrate and/or metal article, the method comprising the steps of:

coating a material on a grid, said material comprising a binder and a metal powder of a superalloy;

spreading the material on said grid so as to pass said material through said grid thereby obtaining a plurality of plates, superposing said plates to obtain a flexible sheet;

cutting said flexible sheet based on dimensions of said face to be protected thereby forming a preform;

placing said preform on said face to be protected; and establishing a bond between said preform and said face to be protected by adjusting a temperature of said preform on said face to be protected.

12. The method of claim 11, wherein said binder is metallic.

13. The method of claim 11, wherein said step of establishing said bond between said preform and said face to be protected is performed by brazing.

14. The method of claim 11, wherein a mesh of said grid has a dimension in a range of 0.1 mm to 0.5 mm.

15. The method of claim 11, wherein a grain size of the metal powder is less than or equal to 90 μm in size.

16. The method of claim 11, wherein a grain size of the metal powder is in a range of 40 μm to 65 μm.

17. The method of claim 11, further comprising a step of at least partially drying said plates before cutting said flexible sheet so as to allow binding to take place between binders of said plates.

18. The method of claim 11, wherein said flexible sheet has a thickness in a range of 0.3 mm to 2 mm.

19. The method of claim 11, wherein said binder is organic.

20. The method of claim 11, wherein said binder comprises PTFE.

* * * * *